United States Patent
McNabb et al.

(10) Patent No.: US 10,929,897 B2
(45) Date of Patent: Feb. 23, 2021

(54) PROMPTING A USER FOR FEEDBACK BASED ON USER EXPERIENCE

(71) Applicant: Disney Enterprises, Inc., Burbank, CA (US)

(72) Inventors: Michael McNabb, San Francisco, CA (US); Kathleen Reilly, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 182 days.

(21) Appl. No.: 15/444,148

(22) Filed: Feb. 27, 2017

(65) Prior Publication Data

US 2018/0247347 A1    Aug. 30, 2018

(51) Int. Cl.
| | |
|---|---|
| *G06Q 30/02* | (2012.01) |
| *G06Q 30/06* | (2012.01) |
| *G06Q 10/10* | (2012.01) |
| *G06F 9/54* | (2006.01) |
| *G06F 11/30* | (2006.01) |

(52) U.S. Cl.
CPC ......... *G06Q 30/0282* (2013.01); *G06F 9/542* (2013.01); *G06F 11/302* (2013.01); *G06F 11/3055* (2013.01)

(58) Field of Classification Search
CPC ............... G06Q 10/20; G06Q 30/0281; G06Q 30/0282; G06F 9/542; G06F 11/302; G06F 11/3055
USPC ................................................... 705/1.1–912
See application file for complete search history.

(56) References Cited

U.S. PATENT DOCUMENTS

| | | | | |
|---|---|---|---|---|
| 7,860,803 | B1* | 12/2010 | Chang .................... | G06Q 10/10 235/380 |
| 7,885,863 | B2* | 2/2011 | Ojakaar ................. | G06Q 30/02 705/26.1 |
| 7,996,252 | B2* | 8/2011 | Shahrabi .............. | G06Q 10/063 705/7.32 |
| 8,370,190 | B1* | 2/2013 | Larson ................ | G06F 16/9537 705/7.32 |
| 8,504,410 | B2* | 8/2013 | Pasta ..................... | G06Q 30/02 705/14.27 |
| 9,792,615 | B2* | 10/2017 | Lewis .................... | G06Q 30/06 |
| 10,083,232 | B1* | 9/2018 | Durham ............ | G06F 17/30772 |
| 10,380,656 | B2* | 8/2019 | Akpala .............. | G06Q 30/0282 |
| 2008/0071602 | A1* | 3/2008 | Ojakaar ................. | G06Q 30/02 705/14.44 |
| 2015/0100457 | A1* | 4/2015 | Scipioni ............. | G06Q 30/0633 705/26.8 |
| 2015/0310508 | A1* | 10/2015 | Pattekar ............. | G06Q 30/0282 705/2 |

(Continued)

OTHER PUBLICATIONS

Arash Payan, "Presenting, Appirater", https://arashpayan.com/blog/2009/09/07/presenting-appirater/, Sep. 7, 2009, 2 Pages.

*Primary Examiner* — Jonathan P Ouellette

(74) *Attorney, Agent, or Firm* — Artegis Law Group, LLP

(57) ABSTRACT

One embodiment of the present invention sets forth a technique for prompting a user for feedback based on user experience. The technique includes detecting, via a processor, that a first application event has occurred and updating a score based on a first value assigned to the first application event. The technique further includes determining that the score exceeds a first threshold, and, in response, outputting a first prompt for display.

18 Claims, 10 Drawing Sheets

(56) References Cited

U.S. PATENT DOCUMENTS

| | | | |
|---|---|---|---|
| 2016/0104216 A1* | 4/2016 | Turner | G06Q 30/0282 |
| | | | 705/347 |
| 2016/0140637 A1* | 5/2016 | Szabo | G06Q 30/0623 |
| | | | 705/14.54 |
| 2016/0267505 A1* | 9/2016 | Murphy | G06Q 30/0203 |
| 2017/0186055 A1* | 6/2017 | Silkey | G06Q 30/01 |
| 2018/0025393 A1* | 1/2018 | Scheel | G06Q 30/0282 |
| | | | 705/7.29 |

* cited by examiner

PROMPTING A USER FOR FEEDBACK BASED ON USER EXPERIENCE

BACKGROUND OF THE INVENTION

Field of the Invention

Embodiments of the present invention relate generally to software applications and, more particularly, to prompting a user for feedback based on user experience.

Description of the Related Art

With the proliferation of software applications in online application stores, commonly referred to as "app" stores, users increasingly rely on online feedback to determine which applications to use. In particular, users can provide feedback for an application via an online interface, such as by giving the application a numerical rating and/or by providing a user review. This feedback is informative to potential users and enables application designers to identify problems with an application, such as issues with stability or compatibility. Feedback is also useful in determining whether certain application features are attractive to users. Such feedback can then be implemented in the design of future versions of the application.

Although users generally have the option to provide feedback about a software application via an online interface, not all users routinely do so. Accordingly, in order to encourage more users to provide feedback, application designers commonly display feedback prompts to users. For example, a user may be prompted to provide a rating after the user has launched a software application a certain number of times or after the user has used the application for a specified amount of time. However, these techniques have several drawbacks.

As an example, when a user is having technical difficulties with a software application, the application may repeatedly crash and re-launch. If the user is prompted for feedback after the application been has launched a certain number of times, then the user may be prompted to provide feedback prematurely, while the user is potentially frustrated with the application. Consequently, under such circumstances, the user is more likely to provide a negative rating for the application. In addition, requesting user ratings after a specified amount of time indiscriminately prompts a user for feedback, irrespective of whether the user is likely to provide a positive or negative rating.

As the foregoing illustrates, what is needed in the art is a more effective technique for prompting a user for feedback.

SUMMARY OF THE INVENTION

One embodiment of the present invention sets forth a method for prompting a user for feedback based on user experience. The method includes detecting, via a processor, that a first application event has occurred and updating a score based on a first value assigned to the first application event. The method further includes determining that the score exceeds a first threshold, and, in response, outputting a first prompt for display.

Further embodiments provide, among other things, a non-transitory computer-readable medium and a computing device configured to implement the method set forth above.

At least one advantage of the disclosed techniques is that a user is prompted for feedback when the user is having a positive experience with an application, thereby increasing the likelihood that the user will provide positive feedback. In addition, when a user is having a negative experience with an application, the user may be prompted to visit a help page and/or invited to contact technical support, enabling the user to resolve the application issues and reducing the likelihood that the user will submit negative feedback.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

Figure 1:
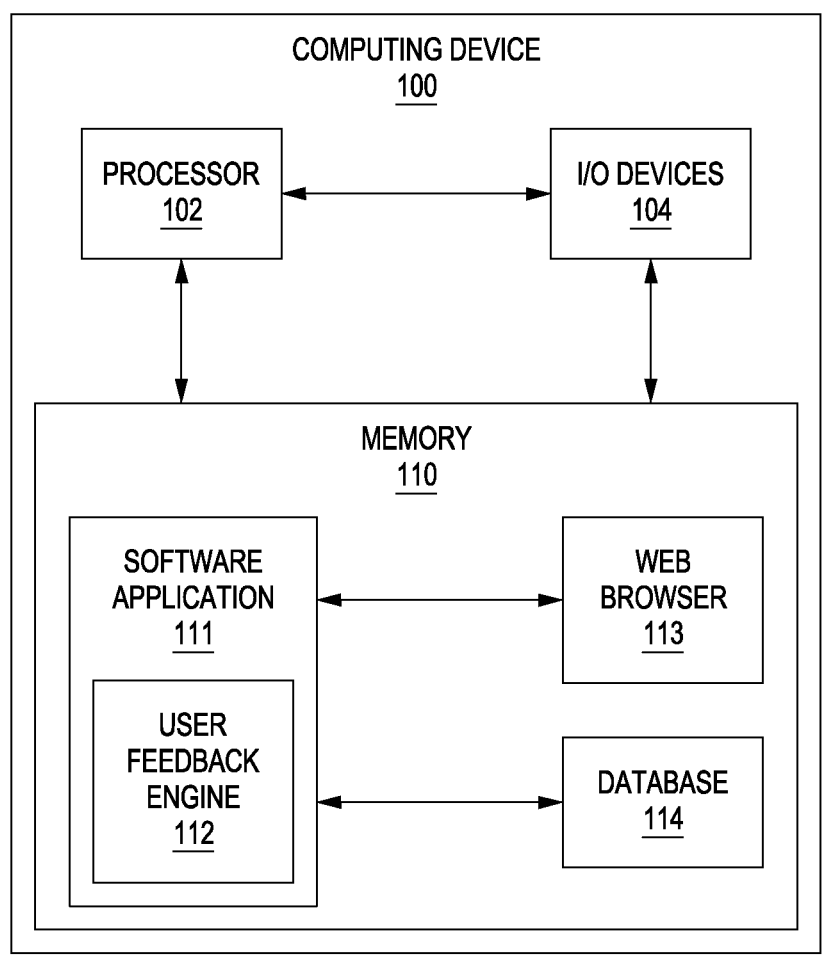
FIG. 1 illustrates a conceptual block diagram of a computing device configured to implement one or more aspects of the present invention.

FIG. 1 illustrates a conceptual block diagram of a computing device 100 configured to implement one or more aspects of the present invention. As shown, the computing device 100 includes a processor 102, input/output (I/O) devices 104, and a memory 110. The memory 110 includes a software application 111 that communicates with an external application 113 and a database 114. The software application 111 includes the user feedback engine 112.

The processor 102 may be any technically feasible form of processing device configured to process data and execute program code. The processor 102 could be, for example, and without limitation, a central processing unit (CPU), an application-specific integrated circuit (ASIC), a digital signal processor (DSP), a field-programmable gate array (FPGA), and so forth.

Memory 110 may include a memory module or a collection of memory modules. The software application 111 and user feedback engine 112 within memory 110 are executed by the processor 102 to implement the overall functionality of the computing device 100. For example, and without limitation, the software application 111 may include any application for which a user can provide feedback, such as a gaming application, a media application, a productivity application, and/or other types of software applications. In various embodiments, the user feedback engine 112 detects application events and analyzes the application events in order to calculate an experience score. The user feedback engine 112 then tracks the user experience score to determine whether a feedback prompt should be displayed to a user. In general, the processing performed by the user feedback engine 112 may include, for example, detecting application events, determining whether an application event occurred within a specified time window, weighting values assigned to application events, determining whether an experience score exceeds a threshold, causing prompts to be displayed, and/or other types of data processing.

The external application 113 within memory 110 may access one or more computer networks, for example, in order to send and/or receive information to and/or from a website, a remote database, etc. Database 114 within memory 110 may store application events, values assigned to application events, the times at which application events were detected, algorithms for weighting the values assigned to application events, and/or other types of data associated with application events.

I/O devices 104 may include input devices, output devices, and devices capable of both receiving input and providing output. For example, and without limitation, I/O devices 104 could include human interface devices and wired and/or wireless communication devices that send data to and/or receive data from the computing device 100.

As noted above, conventional techniques for prompting a user for feedback suffer from a number of drawbacks. In particular, techniques which rely on prompting a user for feedback after a certain number of application launch events have occurred can result in the application requesting feedback from users who are likely to provide negative feedback. For example, when an application is functioning properly, the application will continue to run in the background between sessions. By contrast, when multiple application failures are encountered, the application may repeatedly crash and re-launch. As a result, a user that is experiencing repeated application failures will reach the application launch event threshold more quickly than a user that is having a positive experience with the application. Consequently, a user that is having issues with an application may be prompted to provide feedback prematurely, while the user is frustrated with the application, increasing the probability that the user will provide negative feedback.

Furthermore, requesting feedback from a user after a set amount of time indiscriminately prompts the user for feedback, irrespective of whether the user is likely to provide positive or negative feedback. Thus, a user that is having a negative experience with an application may, upon reaching the set amount of time, be prompted to provide feedback for the application, which may result in the user submitting negative feedback.

Various embodiments described herein overcome these and other deficiencies of conventional approaches for prompting users to provide feedback for a software application. Specifically, in various embodiments, the user feedback engine 112 detects when certain application events have occurred. The user feedback engine 112 then determines whether a value has been assigned to each application event. If a value has been assigned to an application event, then the user feedback engine 112 updates an experience score that reflects the overall user experience. In some embodiments, the user feedback engine 112 calculates the experience score based on application events that have occurred recently, such as application events that have occurred within a specified time window. For example, the user feedback engine 112 could apply a weighting to the value of each application event based on an amount of time that has elapsed since the event was detected. The user feedback engine 112 could then sum the weighted values to calculate the experience score.

Further, in various embodiments, the experience score may be based on the user's experience with multiple applications. For example, one or more software instances of the user feedback engine 112 could track and accumulate the experience score across multiple software applications, such as software applications executing on a smartphone, laptop computer, desktop computer, video game console, set-top box, television, etc. In such embodiments, the experience score may be stored on a remote server (e.g., a "cloud" server).

Next, if the experience score exceeds a positive threshold and/or a negative threshold, then the user feedback engine 112 may display one or more prompts to the user and/or direct the user to an interface through which the user can provide feedback. For example, when the experience score exceeds a positive threshold, the user feedback engine 112 could display one or more prompts to the user in order to determine whether to direct the user to provide feedback for the software application 111. Based on the user's response(s), the user feedback engine 112 could then, for example, provide the user with a URL to enable the user to provide feedback for the software application 111. In some embodiments, the user feedback engine 112 could also allow the user to opt-out of providing feedback for the current version of the software application 111 and/or remind the user to provide feedback for the software application 111 after a configurable amount of time.

If, on the other hand, the experience score exceeds a negative threshold, then the user feedback engine 112 may display one or more prompts to the user in order to determine whether to direct the user to a help page and/or to contact a technical support team affiliated with the software application 111. Alternatively, upon determining that the experience score exceeds a negative threshold, the user feedback engine 112 could forward the user directly to a help page and/or to a technical support interface.

These techniques, as well as additional techniques described below, increase the likelihood that users will be directed to provide feedback for an application only when the users are having a positive experience with a software application 111. In addition, users that are having a negative experience with a software application 111 may be provided with technical assistance, enabling the users to resolve any issues they may be having with the software application 111. Examples of such techniques are described below in further detail in conjunction with FIGS. 2, 3A-3C, 4A-4D, and 5.

Figure 2:
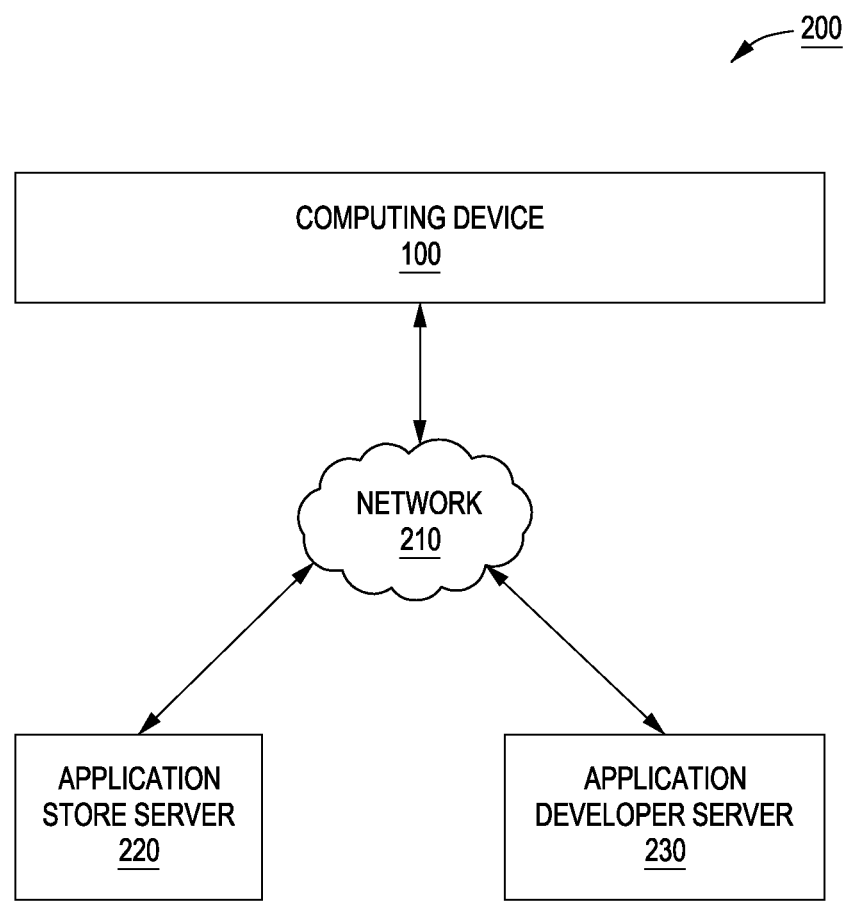
FIG. 2 illustrates a conceptual block diagram of a network through which the computing device of FIG. 1 communicates with one or more servers, according to various embodiments of the present invention.

FIG. 2 illustrates a conceptual block diagram of a network through which the computing device of FIG. 1 communicates with one or more servers, according to various embodiments of the present invention. As shown, the computing device 100 transmits and/or receives information, such as application data, user credentials, etc., to and/or from the application store server 220 via the network 210. In some embodiments, the software application 111 and/or the external application 113 provide an interface that enables a user to log into the application store server 220. The user could then access information on the application store server 220, such as application content, software application updates, user account information, a user feedback interface, and/or other types of data related to the software application 111.

The application developer server 230 may store one or more versions of the software application, user account information, user feedback information, troubleshooting information, and/or a technical support interface. In some embodiments, the computing device 100 may transmit requests to the application developer server 230, such as a request related to a technical issue associated with a software application and/or a request to interact with technical support specialists. In addition, the application developer server 230 may provide updated versions of the software application 111 to the application store server 220 via the network 210. Further, user feedback received via the application store server 220 and/or via software application 111 may be forwarded to the application developer server 230 via the network 210.

In various embodiments, when the user feedback engine 112 directs a user to submit feedback for the software application 111, the external application 113 may connect to the application store server 220 via the network 210. The user may then log into a user account associated with the application store server 220 and provide feedback via the external application 113. Although various embodiments discussed herein describe that a user may interact with the application store server 220 via the software application 111 and/or the external application 113, any other type of interface may be implemented by a user to provide feedback. For example, in some embodiments, a user could interact with the application store server 220 via an interface provided by the application developer server 230 and/or via a third-party application, such as an "app store" interface provided by Apple®, Google®, Microsoft® and/or any other software provider.

Figure 3A:
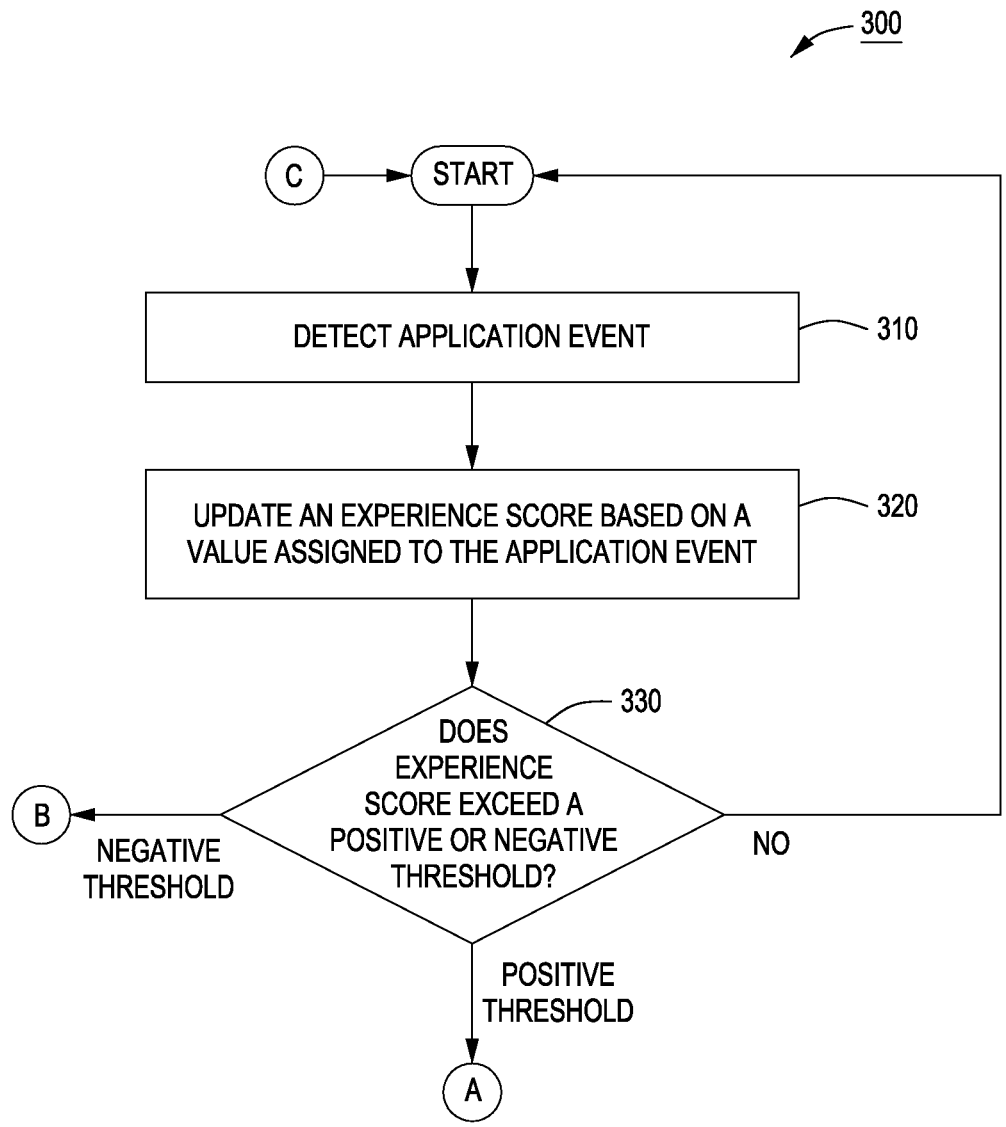
FIGS. 3A-3C illustrate a flow diagram of method steps for prompting a user for feedback based on user experience, according to various embodiments of the present invention.
Figure 3B:
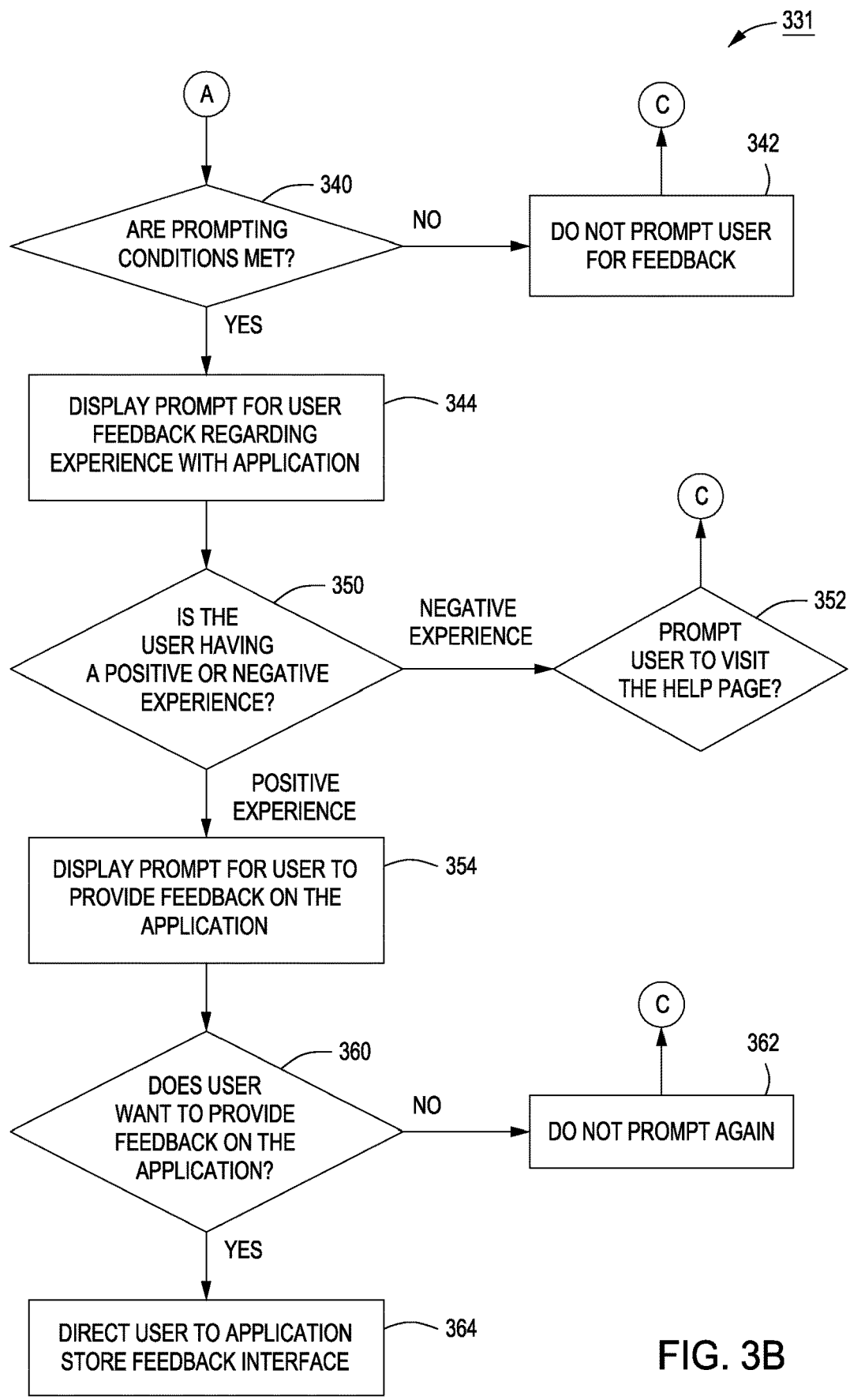
Figure 3C:
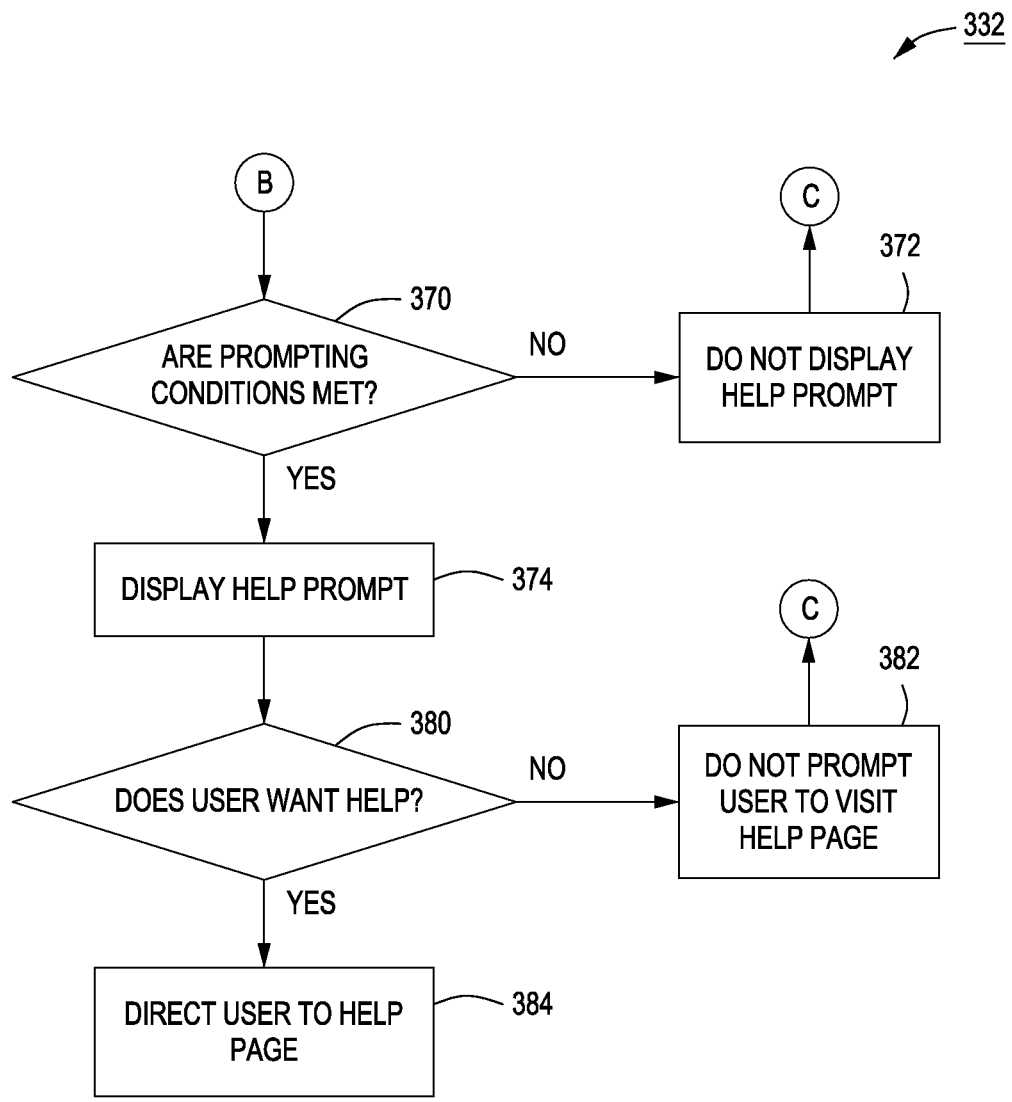

FIGS. 3A-3C illustrate a flow diagram of method steps for prompting a user for feedback based on user experience, according to various embodiments of the present invention. Although the method steps are described in conjunction with the systems of FIGS. 1 and 2, persons skilled in the art will understand that any system configured to perform the method steps, in any order, falls within the scope of the present invention.

As shown, a method 300 begins at step 310, where the user feedback engine 112 detects that an application event has occurred. In various embodiments, an application event may include any change of state associated with the software application 111 that directly or indirectly affects the user experience. For example, application events could include, without limitation, a user starting and/or finishing media content, such as a movie, a TV show, a short video, a music track, an electronic book, etc. Application events could further include, without limitation, a user downloading an application feature, a user reaching a particular video game level, a user acquiring a particular object or skill associated with the software application 111, a user successfully completing a task, a user failing to complete a task, an application launch, an application failure, an error message being displayed, an application being used for a threshold amount of time, etc. Any other type of application event that affects the user experience may be implemented within the scope of various embodiments.

After detecting an application event, at step 320, the user feedback engine 112 updates an experience score based on a value assigned to the application event. As described above, the experience score associated with a particular user indicates whether the user is likely to be having a positive experience or a negative experience with the software application 111. This information, in turn, indicates whether the user is likely to provide positive feedback (e.g., a rating or user review) for the software application 111 and/or whether the user could benefit from receiving technical support.

In various embodiments, the sign (i.e., positive or negative) of the value assigned to a particular application event may be based on whether the application event is likely to have a positive or negative effect on the user experience. For example, positive values could be assigned to application events that are likely to have a positive impact on the user experience, while negative values could be assigned to application events that are likely to have a negative impact on the user experience. Further, the magnitude of each value could be based on the degree to which the corresponding application event is likely to affect the user experience. Table 1, shown below, provides an example of values that could be assigned to various types of application events.

TABLE 1

Example application events and related values

| Application Event | Value |
| --- | --- |
| Finish watching a movie or TV show | 1.0 |
| Finish watching a short video | 0.5 |
| Create a sub-profile | 0.5 |
| Finish playing an audio track | 0.25 |
| No positive application events encountered after using application for a threshold amount of time | −0.25 |
| Error panel displayed | −0.5 |
| Application crash | −1.0 |

In various embodiments, values that have been assigned to the application events may be stored in the database 114. For example, when the user finishes watching a movie, the user feedback engine 112 could, at step 310, detect that an application event has occurred and access the database 114 to determine that the application event has been assigned a value of 1.0. Then, at step 320, the user feedback engine 112 could retrieve the current experience score from the database 114 and increment the experience score by 1.0.

Additionally, in some embodiments, the user feedback engine 112 could store the times at which specific application events occurred in the database 114. Then, when determining and/or updating the experience score (e.g., at step 320), the user feedback engine 112 could access the database 114 and obtain values of application events that have occurred within a particular time window, such as within the last 3 days, within the last week, within the last month, etc.

In some embodiments, the user feedback engine 112 could also retrieve, from the database 114, the time at which each application event occurred. The user feedback engine 112 could then weight the value(s) associated with each application event based on the amount of time that has elapsed since the application event occurred. The user feedback engine 112 could then calculate the experience score based on the sum of the weighted values. In some embodiments, the experience score may be stored locally (e.g., in database 114) or on a remote server. For example, an experience score could be calculated based on Equations 1-3, wherein n is the number of application events within the time window, i is the $i^{th}$ application event included in the n application events, $x_i$ is the value assigned to the $i^{th}$ application event, $t_i$ is the time at which the $i^{th}$ application event occurred, $y_i$ is the amount of time that has elapsed since time $t_i$, z is the duration of the time window, and $w_i$ is the weighted value associated with the value $x_i$:

$$w_i = \left(1.0 - \frac{y_i}{z}\right)x_i \quad \text{(Eq. 1)}$$

$$\sum_{i=1}^{n} w_i \text{ denote the sum } w_1 + w_2 + \ldots + w_n \quad \text{(Eq. 2)}$$

$$\sum_{i=1}^{n} w_i = \sum_{i=1}^{n} \left(1.0 - \frac{y_i}{z}\right)x_i \quad \text{(Eq. 3)}$$

Next, at step 330, the user feedback engine 112 compares the experience score to the positive threshold and/or the negative threshold. As an example, the positive threshold could be assigned a value of 3 and the negative threshold could be assigned a value of −2. In this example, the experience score would exceed this positive threshold if the experience score is greater than (or, in some embodiments, equal to) 3. Further, in this example, the experience score would exceed the negative threshold if the experience score is less than (or, in some embodiments, equal to) −2. In various embodiments, any other values could be assigned to the positive threshold and negative threshold, including non-integer values.

If, at step 330, the user feedback engine 112 determines that the experience score does not exceed the positive threshold or the negative threshold, then the method 300 returns to step 310, where the user feedback engine 112 waits to detect an additional application event. If, on the other hand, the user feedback engine 112 determines that the experience score exceeds the positive threshold, then the method 300 proceeds to step 340, shown in FIG. 3B. At step 340, the user feedback engine 112 optionally determines whether one or more prompting conditions are satisfied.

In some embodiments, these prompting conditions may include verifying that a user account associated with the user meets one or more criteria, such as a minimum age requirement, determining that the computing device 100 is connected to the network 210, and verifying that the software application 111 is not in a preview mode, such as a free version of the software application 111 having limited functionality. Additionally, in some embodiments, at steps 340 and 342, the user feedback engine 112 could determine that a prompt for user feedback should not be displayed if the user has already provided feedback for the current version of the software application 111, if the user has declined to provide feedback for the current version of the software application 111, and/or if the user is not using the most recent version of the software application 111.

Further, in some embodiments, at steps 340 and 342, the user feedback engine 112 could determine that a prompt for user feedback should not be displayed if the user has not operated the software application 111 for a minimum number of sessions (e.g., 3 sessions) and/or if a minimum amount of time has not elapsed since the user first executed the application (e.g., 5 days). In some embodiments, each session is defined as substantially continuous use of the software application 111 for a particular amount of time, where at least 30 minutes of idle time is present between each session.

If the optional prompting condition(s) are satisfied, then the user feedback engine 112 may display one or more prompts to the user and/or direct the user to a feedback interface, as described below in conjunction with steps 344 through 364. If the optional prompting condition(s) are implemented, and the prompting condition(s) are not satisfied, then method 300 proceeds to step 342, where the user feedback engine 112 determines that a prompt will not be outputted for display. The method 300 may then proceed to step 310, where the user feedback engine 112 detects another application event. Alternatively, in some embodiments, after determining that the prompting condition(s) are not satisfied, the user feedback engine 112 may monitor the software application 111 and/or computing device 100 in order to determine when the prompting conditions have been satisfied. Then, once the user feedback engine 112 determines that the prompting conditions have been satisfied, the method 300 may proceed to step 344.

Figure 4A:
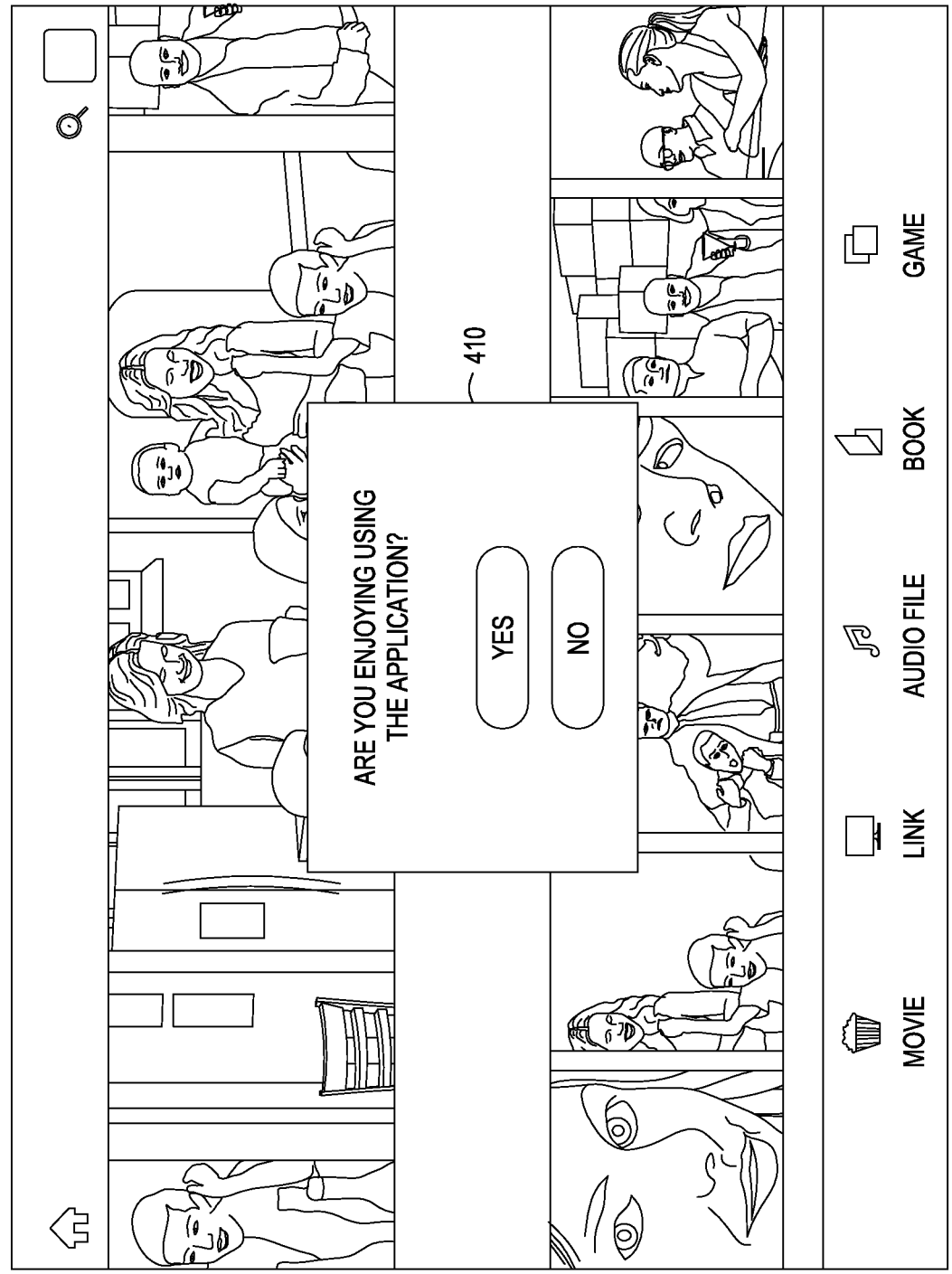
FIG. 4A illustrates a prompt for determining whether a user is having a positive application experience that is displayed via the user feedback engine, according to various embodiments of the present invention.

At step 344, the user feedback 112 engine outputs a prompt for display in order to confirm that the user is having a positive experience with the software application 111. For example, as shown in FIG. 4A, the prompt may ask, "Are you enjoying using the application?". At step 350, the user feedback engine 112 determines whether the user indicated that he or she is having a positive experience or a negative experience.

Figure 4B:
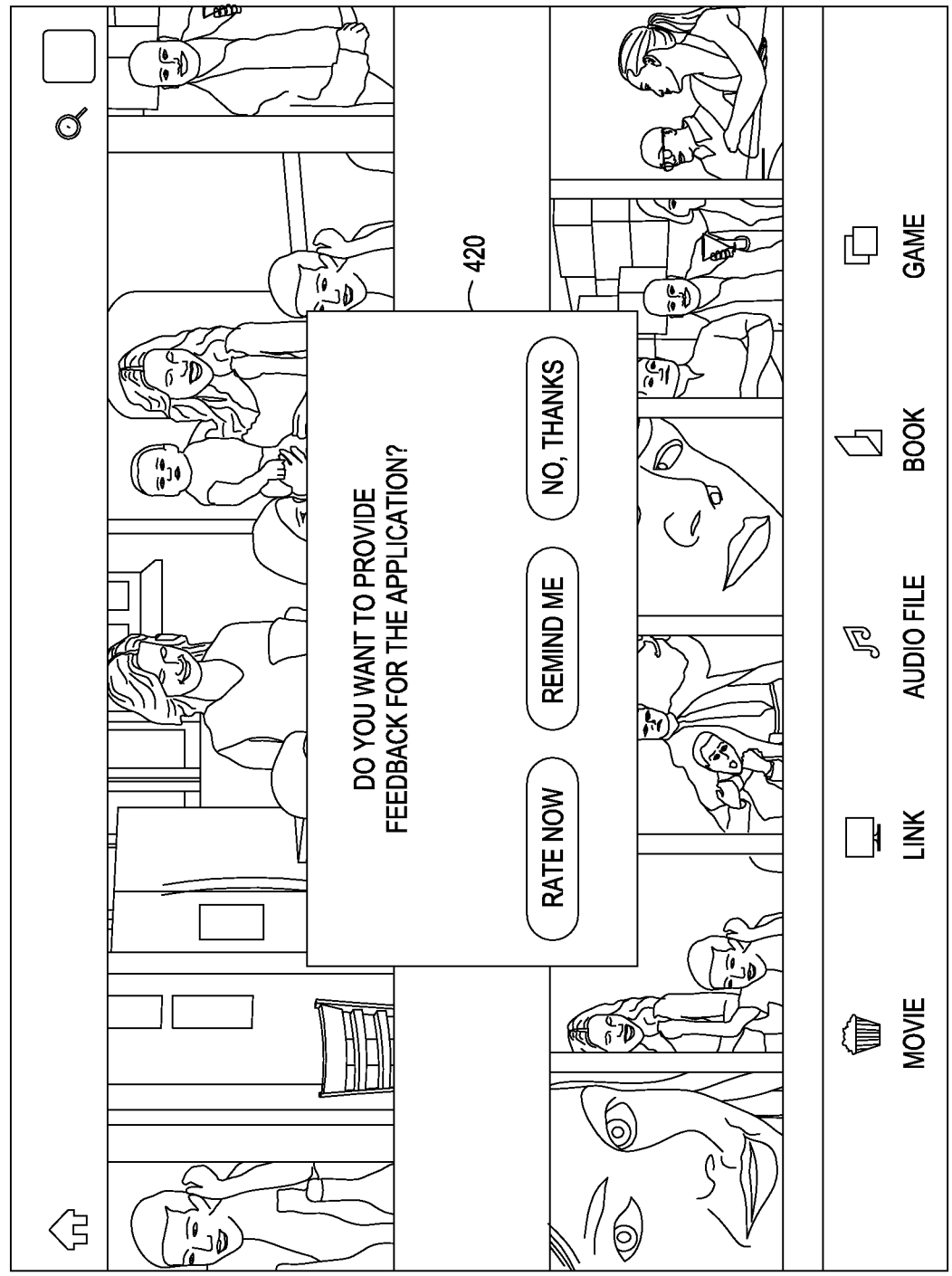
FIG. 4B illustrates a prompt for user feedback that is displayed via the user feedback engine, according to various embodiments of the present invention.
Figure 5:
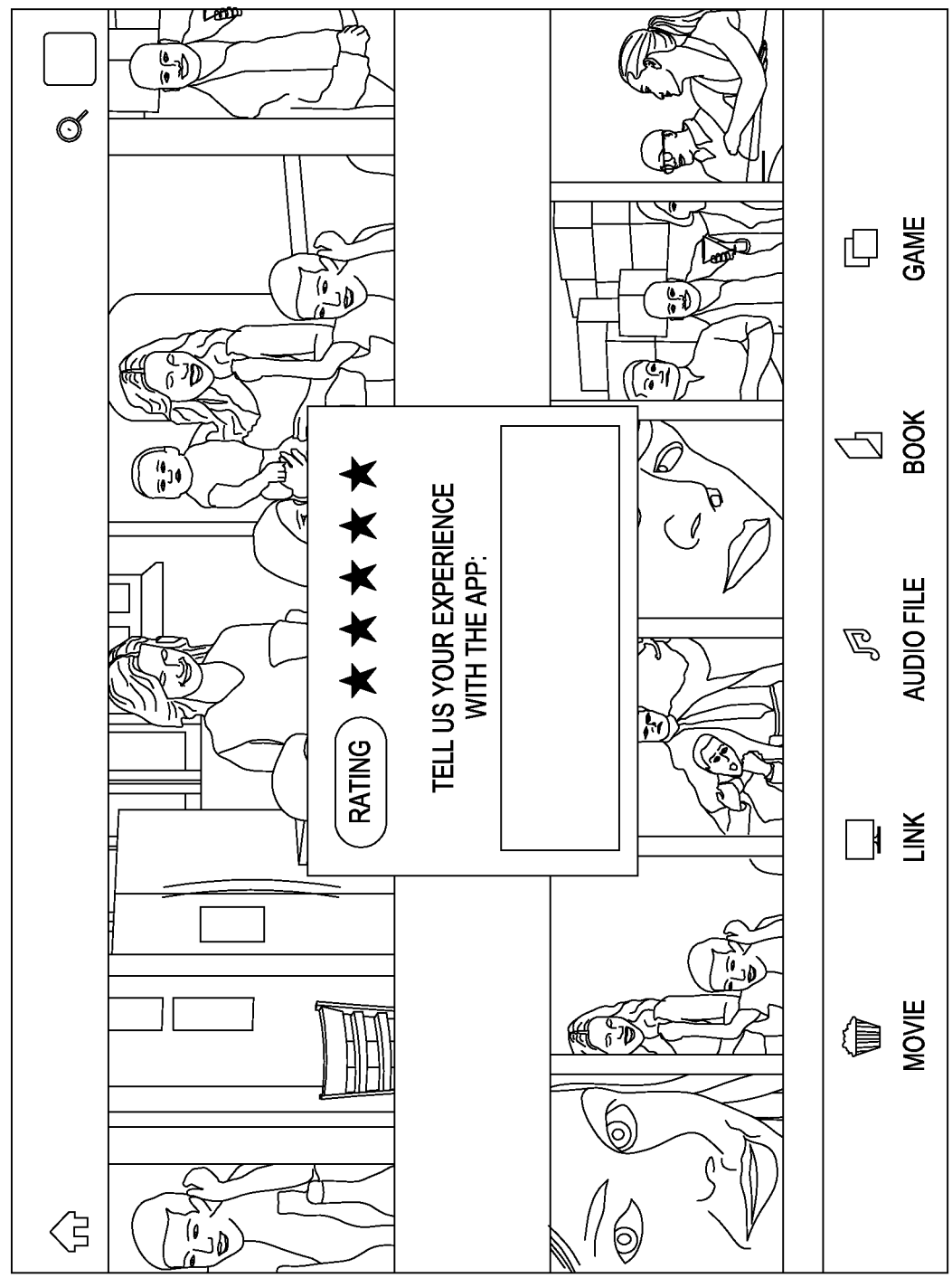
FIG. 5 illustrates a user feedback interface displayed via the user feedback engine or via a third-party application, according to various embodiments of the present invention.

If the user feedback engine 112 determines that the user indicated a positive experience, then the method 300 proceeds to step 354, where the user feedback engine 112 may output a second prompt for display. For example, as shown in FIG. 4B, the prompt may ask, "Do you want to provide feedback for the application?". Based on the user's response, at step 360, the user feedback engine 112 determines whether the user would like to provide feedback for the software application 111. If the user feedback engine 112 determines that the user would like to provide feedback, then the method proceeds to step 364, where the user feedback engine 112 directs the user to a user feedback interface (e.g., an interface generated by the application store server 220). The user can then submit feedback for the software application 111. An example of a user feedback interface is shown in FIG. 5.

Alternatively, if the user feedback engine 112 determines that the user does not want to provide feedback, then the method proceeds to step 362, where the user feedback engine 112 does not prompt the user for feedback. Additionally, in some embodiments, at step 362, the user feedback engine may determine that no additional prompts for feedback should be displayed to the user. The user feedback engine 112 could then refrain from prompting the user for feedback until a new version (e.g., a software update) of the software application 111 is installed. The method 300 then proceeds to step 310, where the user feedback engine 112 detects another application event.

In some embodiments, the user can choose to be reminded to provide feedback for the software application 111 after a configurable wait time, as shown in FIG. 4B. If, at step 360, the user feedback engine 112 determines that the user has chosen this option, then the user feedback engine 112 may wait a specified amount of time before prompting the user for feedback again.

Figure 4C:
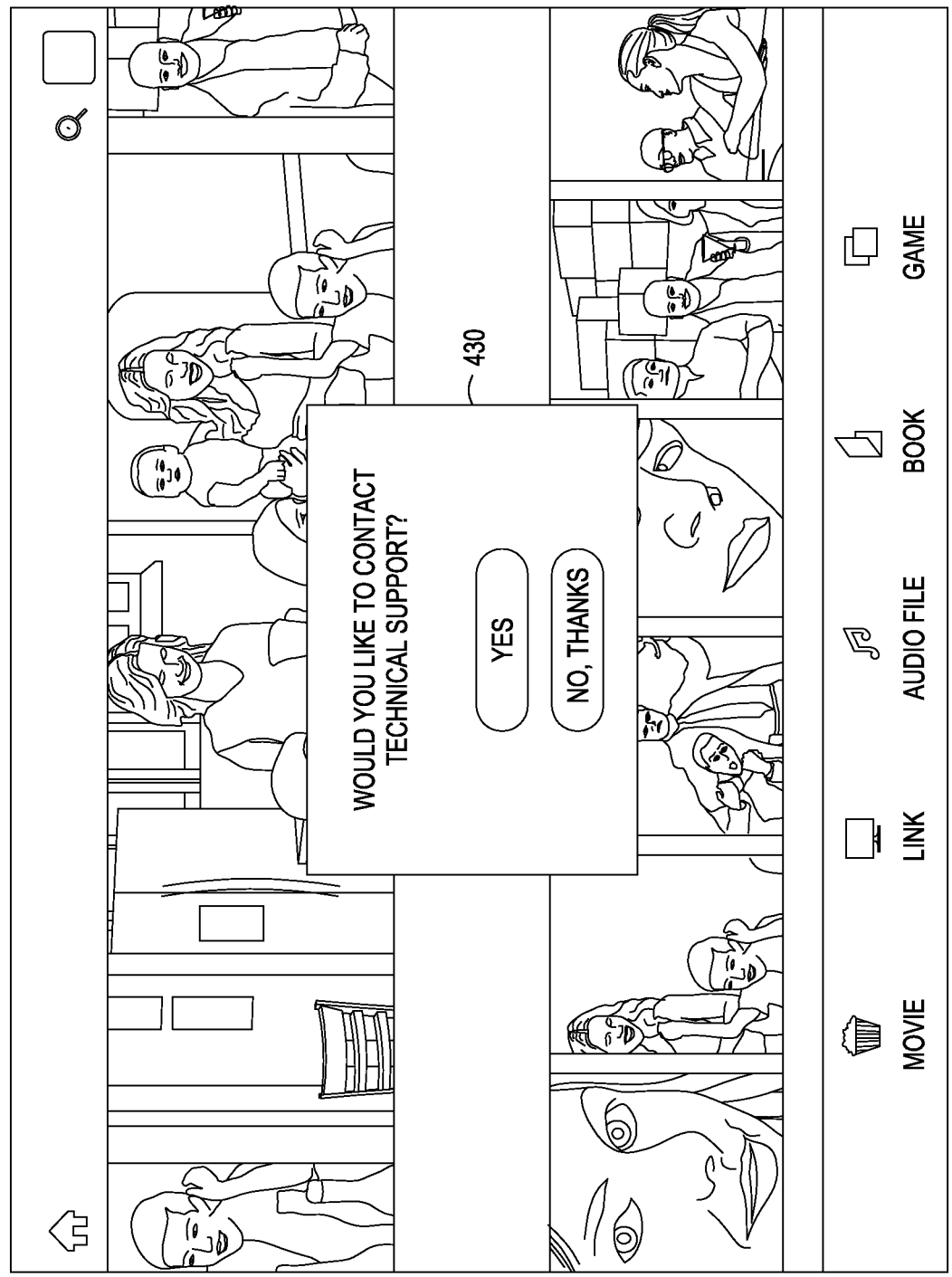
FIG. 4C illustrates a prompt for directing a user to contact technical support that is displayed via the user feedback engine, according to various embodiments of the present invention.
Figure 4D:
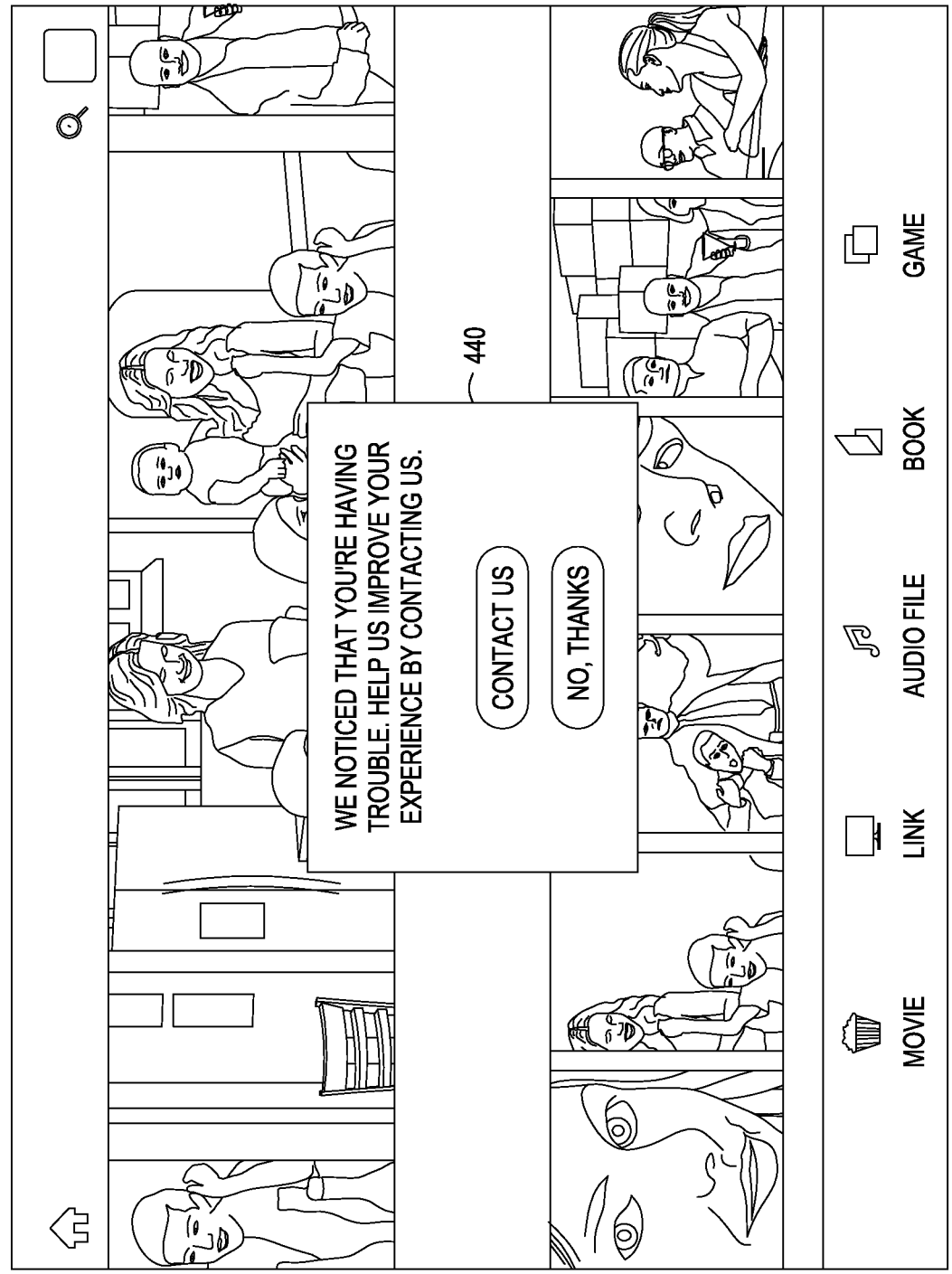
FIG. 4D illustrates a prompt displayed via the user feedback engine after an application has recovered from an application crash, according to various embodiments of the present invention.

If, at step 350, the user feedback engine 112 determines that the user indicated a negative experience, then the method 300 proceeds to step 352, where the user feedback engine 112 prompts the user to visit a technical support page, as shown in FIG. 4C. If user feedback engine 112 determines that the user would like to visit a technical support page, then the user feedback engine 112 directs the user to the technical support page, such as by causing a technical support page to be displayed within software application 111 and/or by providing a URL or other type of link associated with the technical support page to the external application 113. In various embodiments, the technical support page may be included in the software application 111, stored on the application store server 220, and/or stored on the application developer server 230. The technical support page may include frequently asked questions and solutions and/or contact information for a technical support team affiliated with the software application 111.

Additionally or alternatively, at step 352, the user feedback engine 112 could prompt the user for feedback regarding how a particular aspect of the user experience (e.g., a particular application feature) could be improved. If, at step 352, the user feedback engine 112 determines that the user does not want to visit a technical support page, then the method 300 returns to step 310, where the user feedback engine 112 detects another application event.

Returning to step 330, if the user feedback engine 112 determines that the experience score exceeds the negative threshold, then the method 300 proceeds to step 370, shown in FIG. 3C. At step 370, the user feedback engine 112 optionally determines whether one or more prompting conditions are satisfied. In various embodiments, the prompting condition(s) could be similar to or substantially the same as the condition(s) discussed in conjunction with step 340. Alternatively, different prompting conditions could be implemented at step 370.

If, at step 370, the user feedback engine 112 determines that the optional prompting conditions are not satisfied, then method 300 proceeds to step 372, where the user feedback engine 112 determines that a help prompt will not be outputted for display. The method 300 then returns to step 310. If, at step 370, the user feedback engine 112 determines that the optional prompting conditions are satisfied, then the method 300 proceeds to step 374, where the user feedback engine 112 displays a help prompt to the user.

In various embodiments, at step 374, the user feedback engine 112 may prompt the user to visit a technical support page, as shown in FIG. 4C. If, at step 380, the user feedback engine 112 determines that the user would like to visit a technical support page, then the method 300 proceeds to step 384. At step 384, the user feedback engine 112 directs the user to the technical support page, such as in the manner discussed above in conjunction with step 352. For example, the user feedback engine 112 could cause a technical support page to be displayed within software application 111 and/or provide a URL or another type of link associated with the technical support page to the external application 113. If, at step 380, the user feedback engine 112 determines that the user does not want to visit a technical support page, then the method 300 proceeds to step 382, where the user feedback engine 112 determines that a help prompt will not be outputted for display.

Returning to step 370, if user feedback engine 112 determines that the prompting conditions are not satisfied, then the method 300 proceeds to step 372, where the user feedback engine 112 determines that a help prompt will not be output for display. The method 300 then proceeds to step 310, where the user feedback engine 112 detects another application event. As discussed above in conjunction with step 340, at step 370, the user feedback engine 112 could repeatedly determine whether prompting conditions have been satisfied for a certain amount of time before the method 300 returns to step 310. Then, if the prompting conditions have been satisfied within the amount of time, then the method 300 would proceed to step 374, and the user feedback 112 engine would output a help prompt for display.

In order to illustrate the different approaches described herein, Table 2 includes a series of application events detected by the user feedback engine 112 and corresponding values and weightings assigned to each of those application events. As noted above, examples of values that could be assigned to these application events are shown in Table 1. In this example, a positive threshold of 3.0 is implemented by the user feedback engine 112. Additionally, a time window of five days is implemented by the user feedback engine 112, with applications events being weighted on a daily basis according to Equations 1-3.

As shown in Table 2, on day 1, the user feedback engine 112 detects that the user finished reading a book, to which a value of 1.0 is assigned. Accordingly, after day 1, the experience score tracked by the user feedback engine 112 is 1.0.

On day 2, the user feedback engine 112 detects that the user finished watching a movie, to which a value of 1.0 is assigned. Accordingly, on day 2, the experience score computed with Equations 1-3 is 1.0+(1.0*0.8)=1.8, since the previous application event (i.e., the user finishing a book) occurred one day ago, and the time window is five days.

On day 3, the user feedback engine 112 detects that the user finished watching a TV show, to which a value of 1.0 is assigned, and that an application error occurred, to which a value of −0.5 is assigned. Thus, by weighting the values assigned to the application events based on the age of the application events as well as the length of the time window, the experience score is 1.0−0.5+(1.0*0.8)+(1.0*0.6)=1.9.

On day 4, the user feedback engine 112 detects that the user downloaded additional application content, to which a value of 1.0 is assigned, and that the user selected two items as "favorite" items, each of which is assigned a value of 0.5. Consequently, the experience score calculated by the user feedback engine 112 on day 4 is 1.0+0.5*2+(1.0−0.5)*0.8+ (1.0*0.6)+(1.0*0.4)=3.4. Accordingly, at step 330, the user feedback engine 112 would determine that the experience score exceeds the positive threshold of 3.0, and the method 300 would proceed to step 340. Depending on user input received at steps 340, 350, and/or 360, the user may be directed to provide feedback on the software application 111.

TABLE 2

Example experience score calculation
Time window = 5 days/Positive threshold = 3.0

| Day | Application Event | Values and Weightings | Experience Score |
|---|---|---|---|
| 1 | Finish reading a book (1.0) | 1.0 | 1.0 |
| 2 | Finish watching a movie (1.0) | 1.0 + (1.0 * 0.8) | 1.8 |
| 3 | Finishing watching a TV show (1.0) Application error (−0.5) | 1.0 − 0.5 + (1.0 * 0.8) + (1.0 * 0.6) | 1.9 |
| 4 | Download application content (1.0) Favorite two items (0.5 each) | 1.0 + 0.5 * 2 + (1.0 − 0.5) * 0.8 + (1.0 * 0.6) + (1.0 * 0.4) | 3.4 |

Although the examples described herein refer to tracking a user experience associated with a software application 111, the concepts described herein for prompting a user for feedback and/or directing the user to support services based on user experience may be implemented in any context, including A/B testing, product development, focus group feedback and support, etc. In such embodiments, application events may include any type of event to which a value is assigned in order to track a user experience via a user feedback engine or another type of software application.

In sum, a user feedback engine monitors application activity to detect one or more application events. Upon detecting an application event, the user feedback engine updates an experience score. The user feedback engine then determines whether the experience score is above a positive threshold or a negative threshold. If the experience score is above the positive threshold, then the user feedback engine prompts the user for feedback. If the experience score is above the negative threshold, then the user feedback engine directs the user to visit a technical support page and/or invites the user to contact a technical support team.

At least one advantage of the disclosed techniques is that a user is prompted for feedback when the user is having a positive experience with an application, thereby increasing the likelihood that the user will provide positive feedback. In addition, when a user is having a negative experience with an application, the user may be prompted to visit a help page and/or invited to contact technical support, enabling the user to resolve the application issues and reducing the likelihood that the user will submit negative feedback.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable storage media including instructions that, when executed by one or more processors, cause the one or more processors to perform the steps of:

detecting, via the one or more processors, that a first application event has occurred;
  updating a score based on a first value assigned to the first application event, wherein updating the score comprises determining that an age of the first application event falls within a time window, wherein the score is based on a plurality of application events that occurred within the time window;
  determining that the score exceeds a first threshold;
  in response, outputting a first prompt for display that asks a user to provide first feedback specifying whether or not the user is having a positive experience with an application associated with the application event;
  receiving the first feedback from the user that comprises an indication that the user is having a positive experience with the application; and in response, outputting a second prompt for display that asks the user to provide second feedback that comprises a review of the application, wherein the second feedback is different than the first feedback.

2. The one or more non-transitory computer-readable storage media of claim 1, wherein outputting the first prompt for display comprises at least one of outputting a user feedback interface for display or directing a software application to a uniform resource locator (URL) associated with the user feedback interface.

3. The one or more non-transitory computer-readable storage media of claim 1, further comprising:
detecting, via the one or more processors, that a second application event has occurred;
updating the score based on a second value assigned to the second application event;
determining that the score exceeds a second threshold, wherein the first threshold has a first sign that is opposite a second sign of the second threshold; and
in response, outputting a third prompt for display.

4. The one or more non-transitory computer-readable storage media of claim 3, wherein the third prompt comprises a technical support page.

5. The one or more non-transitory computer-readable storage media of claim 1, wherein updating the score comprises:
weighting the first value based on the age of the first application event to generate a weighted value; and
incrementing the score by the weighted value.

6. The one or more non-transitory computer-readable storage media of claim 5, wherein weighting the first value is based on a comparison of the age of the first application event to the time window.

7. The one or more non-transitory computer-readable storage media of claim 1, wherein the first application event comprises at least one of substantially finishing a media content title, completing a video game task, or downloading a software application feature.

8. The one or more non-transitory computer-readable storage media of claim 1, wherein outputting the first prompt for display is further in response to at least one of:
determining that network connectivity is available to an application associated with the first application event;
determining that the application associated with the first application event is not in a preview mode; or
determining that a user age included in a user profile associated with the first application event is above a minimum user age.

9. A method, comprising:
detecting, via a processor, that a first application event has occurred;
updating a score based on a first value assigned to the first application event, wherein updating the score comprises determining that an age of the first application event falls within a time window, wherein the score is based on a plurality of application events that occurred within the time window;
determining that the score exceeds a first threshold;
in response, outputting a first prompt for display that asks a user to provide first feedback specifying whether or not the user is having a positive experience with an application associated with the application event;
receiving the first feedback from the user that comprises an indication that the user is having a positive experience with the application; and
in response, outputting a second prompt for display that asks the user to provide second feedback that comprises a review of the application, wherein the second feedback is different than the first feedback.

10. The method of claim 9, wherein outputting the first prompt for display comprises at least one of outputting a user feedback interface for display or directing a software application to a uniform resource locator (URL) associated with the user feedback interface.

11. The method of claim 9, further comprising:
detecting, via the processor, that a second application event has occurred;
updating the score based on a second value assigned to the second application event;
determining that the score exceeds a second threshold, wherein the first threshold has a first sign that is opposite a second sign of the second threshold; and
in response, outputting a third prompt for display.

12. The method of claim 11, wherein the third prompt comprises a technical support page.

13. The method of claim 9, wherein updating the score comprises:
weighting the first value based on the age of the first application event to generate a weighted value; and
incrementing the score by the weighted value.

14. The method of claim 13, wherein weighting the first value is based on a comparison of the age of the first application event to the time window.

15. The method of claim 9, wherein the first application event comprises at least one of substantially finishing a media content title, completing a video game task, or downloading a software application feature.

16. The method of claim 9, wherein outputting the first prompt for display is further in response to at least one of:
determining that network connectivity is available to an application associated with the first application event;
determining that the application associated with the first application event is not in a preview mode; or
determining that a user age included in a user profile associated with the first application event is above a minimum user age.

17. A computing device, comprising:
one or more memories storing a user feedback engine; and
one or more processors that are coupled to the one or more memories and, when executing the user feedback engine, are configured to:
detect, via the one or more processors, that a first application event has occurred;
update a score based on a first value assigned to the first application event, wherein updating the score comprises determining that an age of the first application event falls within a time window, wherein the score is based on a plurality of application events that occurred within the time window;
determine that the score exceeds a first threshold;
in response, output a first prompt for display that asks a user to provide first feedback specifying whether or not the user is having a positive experience with an application associated with the application event;
receive the first feedback from the user that comprises an indication that the user is having a positive experience with the application; and
in response, output a second prompt for display that asks the user to provide second feedback that comprises a review of the application, wherein the second feedback is different than the first feedback.

18. The computing device of claim 17, wherein the one or more processors are configured to update the score by:
 weighting the first value based on the age of the first application event to generate a weighted value; and
 incrementing the score by the weighted value.

\* \* \* \* \*